United States Patent
Bendik

(10) Patent No.: US 9,576,269 B2
(45) Date of Patent: *Feb. 21, 2017

(54) DOCUMENT MANAGEMENT SYSTEMS AND METHODS

(75) Inventor: Mary M. Bendik, Bethel Park, PA (US)

(73) Assignee: Resource Consortium Limited (VG)

( * ) Notice: Subject to any disclaimer, the term of this patent is extended or adjusted under 35 U.S.C. 154(b) by 571 days.

This patent is subject to a terminal disclaimer.

(21) Appl. No.: 12/855,926

(22) Filed: Aug. 13, 2010

(65) Prior Publication Data

US 2011/0041054 A1 Feb. 17, 2011

Related U.S. Application Data

(63) Continuation of application No. 11/414,827, filed on May 1, 2006, now Pat. No. 7,810,027, which is a continuation of application No. 10/027,879, filed on Dec. 21, 2001, now Pat. No. 7,127,670, which is a continuation of application No. 09/378,785, filed on Aug. 23, 1999, now abandoned.

(51) Int. Cl.
| | |
|---|---|
| *G06F 17/00* | (2006.01) |
| *G06Q 10/10* | (2012.01) |
| *G06F 17/24* | (2006.01) |
| *G06F 17/30* | (2006.01) |
| *G06F 17/22* | (2006.01) |

(52) U.S. Cl.
CPC .............. *G06Q 10/10* (2013.01); *G06F 17/248* (2013.01); *G06F 17/30011* (2013.01); *G06F 17/2235* (2013.01); *Y10S 707/99931* (2013.01)

(58) Field of Classification Search
CPC .............. G06F 17/211; G06F 17/30896; G06F 17/2235; G06F 17/30876

USPC ......................................... 715/200, 205, 255
See application file for complete search history.

(56) References Cited

U.S. PATENT DOCUMENTS

| | | | |
|---|---|---|---|
| 5,142,678 A | 8/1992 | MacPhail | |
| 5,173,853 A | 12/1992 | Kelly | |
| 5,247,661 A * | 9/1993 | Hager | G06Q 10/107 |
| 5,276,869 A * | 1/1994 | Forrest | G06F 17/30011 |
| | | | 707/999.009 |
| 5,446,891 A * | 8/1995 | Kaplan et al. | |
| 5,664,109 A * | 9/1997 | Johnson | G06F 19/322 |
| | | | 705/2 |
| 5,721,940 A * | 2/1998 | Luther | G06F 17/243 |
| | | | 715/200 |
| 5,727,156 A | 3/1998 | Herr-Hoyman | |
| 5,752,020 A | 5/1998 | Ando | |
| 5,778,363 A * | 7/1998 | Light | |

(Continued)

FOREIGN PATENT DOCUMENTS

WO WO0114984 3/2001

OTHER PUBLICATIONS

Sprehe et al., Lifting the Burden, Google 2005, pp. 47-52.*

(Continued)

*Primary Examiner* — Cong-Lac Huynh
(74) *Attorney, Agent, or Firm* — The Belles Group, P.C.

(57) ABSTRACT

A method for managing documents in a computer implemented document management system, includes: creating a document profile that is associated with a document and includes fields of attributes of the document; and creating a link in the document profile to a file type that is not created within the document management system.

16 Claims, 12 Drawing Sheets

(56) References Cited

U.S. PATENT DOCUMENTS

| | | | |
|---|---|---|---|
| 5,802,518 A * | 9/1998 | Karaev | G06F 17/30448 |
| 5,845,067 A | 12/1998 | Porter | |
| 5,887,171 A | 3/1999 | Tada | |
| 5,895,470 A * | 4/1999 | Pirolli et al. | 707/727 |
| 5,913,208 A | 6/1999 | Brown | |
| 5,940,843 A * | 8/1999 | Zucknovich | G06Q 40/00 705/35 |
| 5,956,708 A | 9/1999 | Dyko | |
| 5,999,664 A | 12/1999 | Mahoney | |
| 6,005,597 A | 12/1999 | Barrett | |
| 6,009,442 A * | 12/1999 | Chen | G06F 17/30696 707/E17.082 |
| 6,009,485 A | 12/1999 | Hosotsubo | |
| 6,029,182 A * | 2/2000 | Nehab | G06F 17/30867 707/E17.109 |
| 6,091,518 A * | 7/2000 | Anabuki | H04N 1/32122 358/442 |
| 6,115,509 A | 9/2000 | Yeskel | |
| 6,185,587 B1 | 2/2001 | Bernardo | |
| 6,199,034 B1 * | 3/2001 | Wical | 704/9 |
| 6,199,082 B1 | 3/2001 | Ferrel | |
| 6,324,551 B1 | 11/2001 | Lamping | |
| 6,327,590 B1 * | 12/2001 | Chidlovskii | G06F 17/30867 707/734 |
| 6,349,308 B1 | 2/2002 | Whang | |
| 6,351,747 B1 * | 2/2002 | Urazov | G06F 17/30699 |
| 6,401,097 B1 | 6/2002 | McCotter | |
| 6,424,968 B1 | 7/2002 | Broster | |
| 6,463,447 B2 * | 10/2002 | Marks et al. | 715/234 |
| 6,473,778 B1 | 10/2002 | Gibbon | |
| 6,505,173 B1 | 1/2003 | Weibel | |
| 6,560,605 B2 * | 5/2003 | Albers et al. | |
| 6,567,797 B1 * | 5/2003 | Schuetze et al. | |
| 6,585,777 B1 * | 7/2003 | Ramaley et al. | 715/205 |
| 6,610,104 B1 | 8/2003 | Lin | |
| 6,658,406 B1 * | 12/2003 | Mazner et al. | |
| 6,675,299 B2 * | 1/2004 | Porter | G06F 17/22 707/E17.008 |
| 6,684,369 B1 | 1/2004 | Bernardo | |
| 6,751,620 B2 | 6/2004 | Orbanes | |
| 6,826,727 B1 | 11/2004 | Mohr | |
| 6,853,391 B2 * | 2/2005 | Bates et al. | 715/854 |
| 6,865,713 B1 * | 3/2005 | Bates et al. | 715/233 |
| 7,039,856 B2 * | 5/2006 | Peairs et al. | 715/200 |
| 7,043,698 B2 * | 5/2006 | Newbold | 715/789 |
| 7,127,670 B2 * | 10/2006 | Bendik | 715/200 |
| 7,139,974 B1 * | 11/2006 | Bascom et al. | 715/236 |
| 7,149,784 B2 * | 12/2006 | Kitada et al. | 709/207 |
| 7,158,986 B1 | 1/2007 | Oliver et al. | |
| 7,203,725 B1 * | 4/2007 | Gilmour et al. | 709/206 |
| 7,213,030 B1 | 5/2007 | Jenkins | |
| 7,630,986 B1 * | 12/2009 | Herz et al. | |
| 7,653,288 B2 * | 1/2010 | Jung et al. | 386/248 |
| 7,664,669 B1 * | 2/2010 | Adams et al. | 705/7.32 |
| 7,810,027 B2 * | 10/2010 | Bendik | 715/255 |
| 8,185,813 B2 * | 5/2012 | Graham | G06F 17/30867 715/200 |
| 8,316,016 B1 * | 11/2012 | Hoelzle et al. | 707/723 |
| 8,606,796 B2 * | 12/2013 | Martin et al. | 707/750 |
| 2002/0046224 A1 * | 4/2002 | Bendik | 707/522 |
| 2002/0065857 A1 * | 5/2002 | Michalewicz et al. | 707/532 |
| 2002/0073056 A1 * | 6/2002 | Broster | G06F 17/30867 |
| 2002/0083093 A1 * | 6/2002 | Goodisman et al. | 707/511 |
| 2002/0087573 A1 | 7/2002 | Reuning | |
| 2002/0156801 A1 * | 10/2002 | Kitada | G06F 17/3089 715/255 |
| 2003/0004918 A1 * | 1/2003 | Chang | G06F 9/52 |
| 2003/0074632 A1 * | 4/2003 | Marks | G06F 17/30867 715/234 |
| 2003/0084040 A1 * | 5/2003 | Jeffrey | G06F 17/3069 |
| 2004/0088313 A1 * | 5/2004 | Torres | G06F 17/30011 |
| 2004/0163033 A1 * | 8/2004 | Wolfe et al. | 715/500 |
| 2004/0194032 A1 * | 9/2004 | Liu | G06F 17/2247 715/255 |
| 2004/0220815 A1 * | 11/2004 | Belanger et al. | 705/1 |
| 2005/0078088 A1 * | 4/2005 | Davis et al. | 345/163 |
| 2005/0111723 A1 * | 5/2005 | Hannigan et al. | 382/135 |
| 2005/0162680 A1 * | 7/2005 | Sekiguchi et al. | 358/1.13 |
| 2007/0094244 A1 * | 4/2007 | Wolfe | 707/3 |
| 2007/0168871 A1 * | 7/2007 | Jenkins | G06Q 10/10 715/751 |
| 2012/0233529 A1 * | 9/2012 | Bascom | 715/205 |
| 2013/0159846 A1 * | 6/2013 | Petri | 715/255 |
| 2014/0033192 A1 * | 1/2014 | Lorenz et al. | 717/171 |

OTHER PUBLICATIONS

Appelt et al.. HyperODA—Going beyond Traditional Document Structures, Google 1995, pp. 13-21.*

Lemlouma et al., Universal Profiling for Content Negotiation and Adaption in Heterogeneous Envronments, Google 2002, pp. 1-5.*

Ellman, Using the Generic Document Profile to Cluster Similar Texts, Google 1998, pp. 1-7.*

Critchon et al., A Component Framework Supporting Peer Services for Space Data Management, IEEE 2002, pp. 2639-2649.*

Hong, S.B., et al.; Classifying and Retrieving Software Components Based on Profiles, IEEE Sep. 1997, abstract.

Lee, Yong K., et al.; Querying Structured Hyperdocuments, IEEE Jan. 1996, 155-164.

Gershon, N., Moving Happily Through the Word Wide Web, IEEE Mar. 1996, 72-75.

Hill, K., A perspective: The Roll of Identifiers in Managing and Protecting Intellectual Property in the Digital Age, IEEE, vol. 87; No. 7; (1999); 1228-1238.

Gadney, H. M.; Acess Control for Large Collections, ACM; vol. 15; No. 2; (1997); 154-194.

* cited by examiner

| Document Profile | Document Content |
|---|---|
| Attributes:<br>  Author<br>  Title<br>  Office<br>  Number<br>  Type<br>  Client<br>  Matter<br>  Access<br>  Comments<br>  Additional Documents<br>  Links<br><br>  .<br>  .<br>  .<br><br>30 | Text<br><br>Graphics<br><br>BLOB<br><br>Video<br><br>Audio<br><br>.<br>.<br>.<br><br>20<br><br>10 |

Figure 1

DOCUMENT MANAGEMENT SYSTEMS AND METHODS

CROSS-REFERENCE TO RELATED PATENT APPLICATIONS

This application is a continuation application of U.S. patent application Ser. No. 11/414,827, filed May 1, 2006, now allowed, which is a continuation of U.S. patent application Ser. No. 10/027,879, filed Dec. 21, 2001, now U.S. Pat. No. 7,127,670, which is a continuation application of U.S. patent application Ser. No. 09/378,785, filed Aug. 23, 1999, now abandoned, the disclosures of which are incorporated herein by reference.

FIELD OF THE INVENTION

The present invention relates to systems and methods for management of documents and particularly, to systems and methods for management of documents over a network of computers in which a user can gain access to the information repository from a computer having access to the network.

BACKGROUND OF THE INVENTION

The ability to gain timely access to, important information on a computer, and, more particularly, on a computer network, is a necessity in today's competitive market. As the number of digital documents continues to grow, such access will only gain in importance.

Document management systems automate document management on computer networks and facilitate location and sharing of documents in workgroups without requiring knowledge of, for example, the DOS filename or physical location of a document. A document management system may also provide system administration functions by establishing criteria that are used to, for example, determine storage location and/or determine document archival actions. Furthermore, security criteria can be assigned to limit unauthorized access to documents.

Document management systems typically store critical information required to access a document in a document "profile." The profile may include document attributes or information about the document such as the document type, the author, the creation date, the access rights, etc. The profile information is stored in a database and is used to retrieve the document via a search or query without the user having to remember, for example, the DOS filename and storage location (for example, server\volume:directory\filename). Profiling thus provides quick access to documents.

In addition to locating documents from the information stored in the document profile, a number of document management systems also index document text allowing users to perform full-text searches to find documents. Such full-text searches can require somewhat lengthy searches in large databases.

Although a number of computer implemented document management programs or systems are currently available, it remains desirable to develop improved document management systems and methods.

SUMMARY OF THE INVENTION

The present invention provides a computer implemented method for managing documents including the steps of creating a document profile that includes fields of attributes of a document and generating a unique identifier corresponding to the document (that is, corresponding preferably to the document profile and the associated document content). The unique identifier includes at least a first portion including information descriptive of an attribute of the document and at least a second portion including an automatically generated number. The method preferably further includes the step of storing the document profile for the document. In one embodiment the first portion is descriptive of the author of the document. The second portion is preferably a sequentially generated number that is unique for the first portion. That is, there may be many documents having the same first portion (for example, the initials of the author), but each document identifier having the first portion preferably has a unique number for the first portion.

The present invention also provides a computer implemented method for managing documents including the steps of creating a document profile and selecting a predefined document template for the document during creation of the document profile. The document template defines the format of the document. Preferably, the document profile is stored before any information is entered into a content of the document.

The present invention also provides a computer implemented method for managing documents including the steps of creating a document profile and linking the document profile to a file type that is not created within the document management system. As used herein, the phrase file type refers to generally any stored information that can be read or used by an associated software application. The file type may, for example, be a word processing document, a spreadsheet document, a database record (for example, an email message) or a URL link. Selecting the link from the document profile preferably launches or switches to the software application associated with the file type.

The present invention also provides a method for managing documents including the steps of creating a document profile, storing the document profile, and creating an email message including a link to the document profile so that a recipient of the message can access the document associated with the document profile. Preferably, the email message is created from within the document management system. That is, the user of the document management system can create the email without having to exit the document management system and switch to an email program.

The present invention also provides a method for managing documents including the steps of creating a document profile, storing the document profile, and creating an email message including a copy of the document from within the document management system so that a recipient of the message can access the copy of the document.

The present invention also provides a method for managing documents including the step of defining user access permission for a document profile or an associated document content in the document profile. The step of defining user access permission preferably includes the step acquiring the identity of the user from a source external to the document management system. The source of the identity of the user may, for example, be an operating system security system or a database security system.

The present invention also provides a method for managing documents including the steps of creating at least one document profile that includes fields of attributes of an associated document content and storing the document profile in a database. The method also includes the steps of storing the document content external to the database in a file system of a first storage device and replicating the document content from the first storage device to a second storage device.

As clear to one skilled in the art, any two or more of the above-identified methods of the present invention can be practiced in a single document management system. The present invention also provides a machine readable medium having stored thereon data representing sequencing of instructions for carrying out the above methods, which, when executed by a computer system (as known in the art), cause the computer system to perform the steps of the method(s).

The present invention also provides a computer implemented document management system including a module to create a document profile to be stored in a database in the storage device and, for example, a module to generate a unique identifier for the document. The unique identifier preferably includes at least a first portion including information descriptive of an attribute of the document and at least a second portion including a number generated by the unique identifier generation module.

The document profile creation module preferably further includes a module to select a predefined document template for the document during creation of the document profile. The document profile creation module preferably also includes a module to link the document profile to a file type that is not created within the document management system on an existing document profile.

The document management system preferably further includes a module to link an email message having a link to the document profile so that a recipient of the message can access the document associated with the document profile. The document management system also preferably includes a module to email a message comprising a copy of the document from within the document management system so that a recipient of the message can access the copy of the document.

The document management system preferably further includes a module to define user access permission in the document profile by acquiring the identity of the user from a source external to the document management system.

The present invention and its attendant advantages will be further understood by reference to the following detailed description and the accompanying drawings.

BRIEF DESCRIPTION OF THE DRAWINGS

FIG. 1 illustrates a document including a document profile and document content.

DETAILED DESCRIPTION OF THE INVENTION

The present invention provides for management of documents over, for example, a wide area network in which a user can gain access to the information repository from generally any computer having access to the network. Preferably, access to the documents is enabled via either a dedicated document management interface or via the use of a browser such as Microsoft® Internet Explorer® or Netscape® Navigator®.

In the document management program or system of the present invention, each document 10 (see FIG. 1) preferably comprises two parts, a document content 20 and a document profile 30. Document content 20 is the actual information contained within document 10 and can, for example, include BLOB, text, graphics, video and/or audio information. Document profile 30 includes attributes of the document including, for example, the title, the author, the office location, the document number, the type of document, and the date created. Document content 20 and document profile 30 may be stored together or separately.

Figure 2:
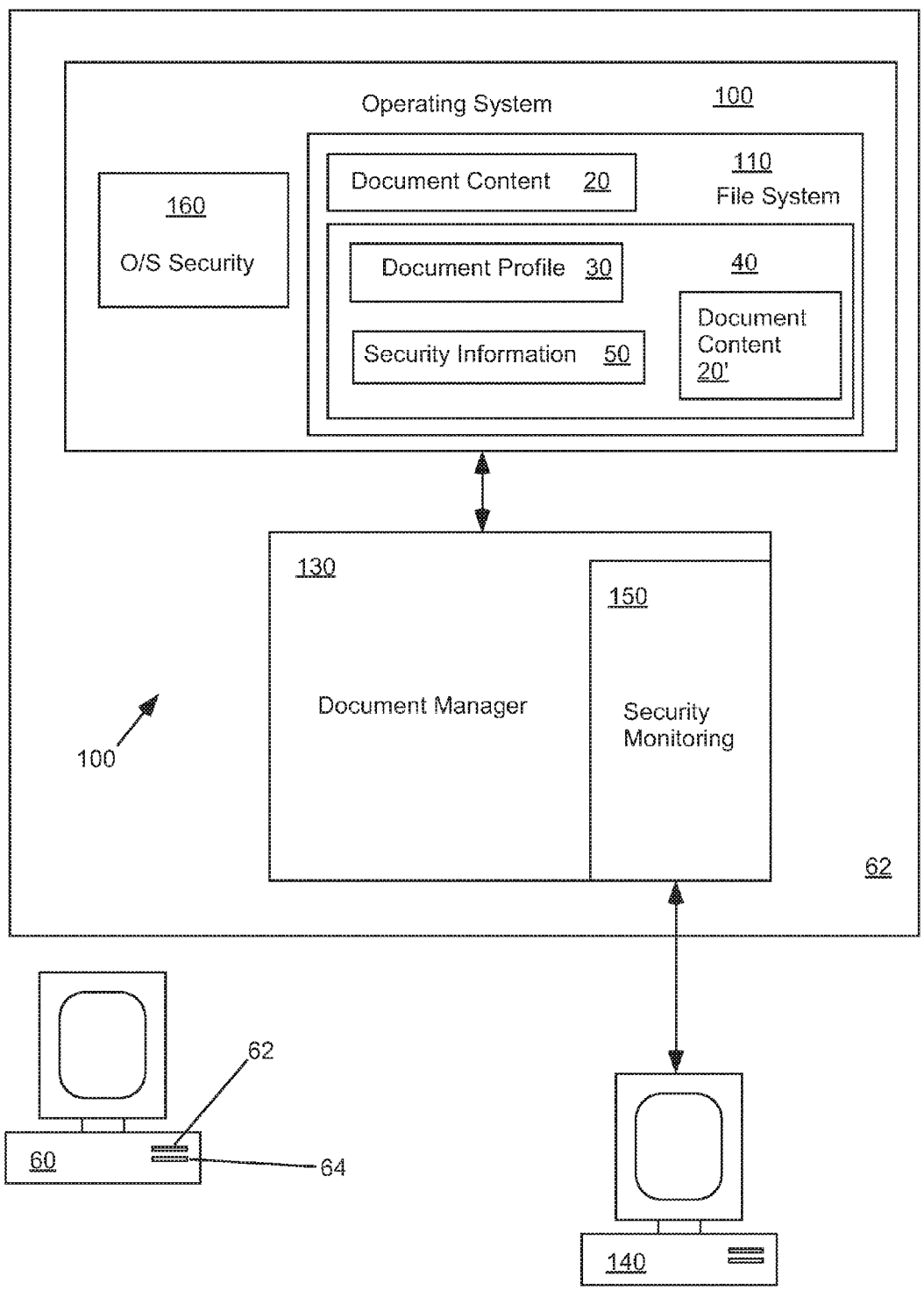
FIG. 2 illustrates an embodiment of the structure of a document management system of the present invention.

FIG. 2 illustrates an embodiment of a document management system of the present invention. In general, the document management system is executed by a computer 60 that includes a storage device 62 (for example, a compact disk or a hard drive as known in the art) and a processing unit 64. In the embodiment of FIG. 2, an operating system 110 and the document management system are both stored on a hard drive 62.

In this embodiment, operating system 110 includes a file system 120 that may contain document content 20 which are stored as individual files as known in the art. File system 120 also contains a database 40 that preferably includes document profiles 30 associated with document content 20 and security information. Preferably, document profile 30 contains security settings for each of document profile 30 and a corresponding document content 20. A document profile 30 can, for example, be made public so that is viewable/accessible by all users of the document management system. Access to document profile 30 can also be limited to a user or group(s) of users. Likewise, document content 20 can be made public or private. In the case that a particular document content 20' is made private, document content 20' is preferably stored as an object within database 40 rather than in file system 120 of operating system 110.

File system 120 is preferably a conventional computer-implemented file system such as provided, for example, in the Microsoft® Windows® operating system, the IBM® OS400 operating system, the UNIX® operating system or the Apple® Macintosh® operating systems. Database 40 is preferably a conventional structural information system storing information as a set of records and attributes or fields.

Security information 50 represents access control information to determine whether a particular user has permission rights to access the document management system and document profiles 30 and/or document contents 20. Document manager 130 accesses document profile 30 and document content 20 and allows a client computer 140 access to document 10 formed by the combination of document content 20 and document profile 30 if permitted by security monitor 50 and the security information within document profile 30.

As described above, operating system 100 may include, for example, the Windows operating system family (for example, Windows NT®, Windows 98® or Windows 95®). Operating system 100 preferably contains a conventional operating system security 160. System security 160 is built into conventional operating system 100. For example, in the case of Microsoft Windows NT, a built in security system is provided which requires entrance of a password for a user to log into the system and thereby gain access to files and to the network. Similarly, many other conventional operating systems require a password or access code to allow a user operating client computer system 140 to log on. Preferably, operating system security 160 or another existing security feature (as provided, for example in Lotus Domino® server) is used by document manager 130 of the present invention to identify users and access permissions of such users. In that regard, security manager 150 of document manager 130 may connect to and operate in conjunction with operating system security 160 or, for example, the Central Administration Address Book of Lotus Domino, to identify users who may access the document management system as well as document profiles 30 and document contents 20 thereof.

Other document management systems typically require an administrator to create users or user tokens within those document management systems. Using an existing user list such as provided in a Lotus address book prevents duplicative labor and simplifies administration of the document management system. In use of the document management system of the present invention, a user is typically first required to log on to the operating system as determined by operating system security 160. The user may also be required to log onto a particular server such as the Lotus Domino server. A user permitted access to the document management system as determined by security monitoring 150 may then use the document management system. Whether the user has access to a particular document profile 30 and corresponding document content 20, is determined by security information established in document profile 30.

Figure 3:
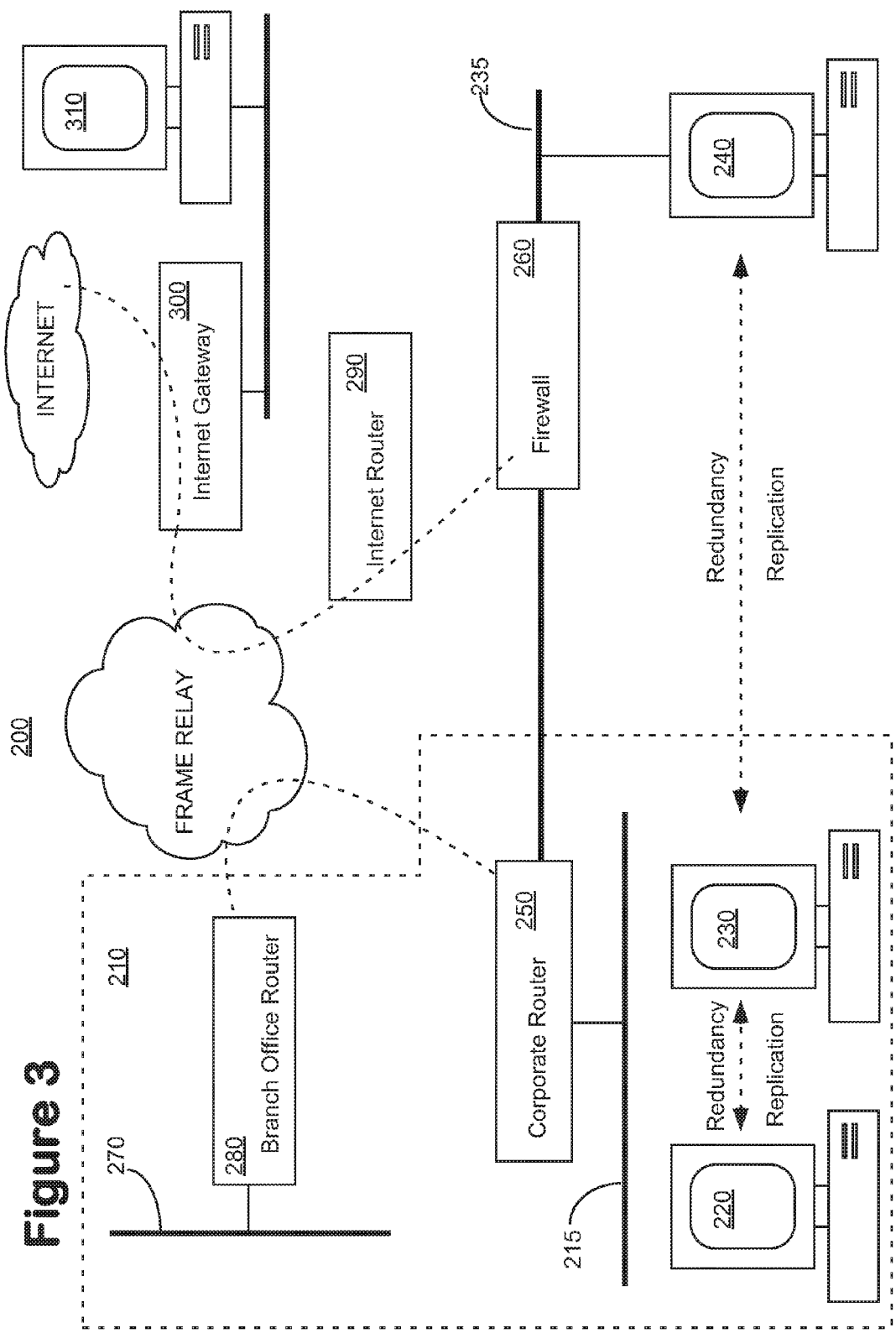
FIG. 3 illustrates a network architecture suitable for use with the document management system of the present invention.

One embodiment of a network architecture 200 suitable for use with the document management system of the present invention is set forth in FIG. 3. In this embodiment, a corporate network or intranet 210 comprises, for example, two servers 220 and 230 on a local area network 215 in a main office. A number of client computer systems (not shown) are also preferably connected to network 215. Network 210 is preferably connected to another network 235 via a router 250 and a firewall 260. Network 235 is an extranet comprising an extranet server 240. The term "extranet" is used herein to describe a shared secure repository of information that is accessible from outside of intranet 210 (for example, over the Internet). Placing extranet server 240 on separate network 235 and isolating it from intranet 210 assists in protecting the network resources of intranet 210.

As known in the art, firewall 260 comprises a system designed to prevent unauthorized access to or from intranet 210. Firewall 260 can be implemented in hardware or software, or in a combination of both. Firewall 260 prevents unauthorized Internet users from accessing intranet 210. All messages entering or leaving intranet 210 pass through firewall 260, which examines each message and blocks those that do not meet specified security criteria.

Local area network 215 is preferably connected to other local area networks in the intranet via router 250. In FIG. 3, local area network 215 is connected to one other local area network 270 in a branch office via router 250 and branch office router 280 using, for example, frame relay protocol or asynchronous transfer mode (ATM).

Extranet 235 is preferably connected to the Internet via firewall 260 and an Internet router 290 using, for example, frame relay or ATM. Internet router 290 may be connected to an Internet gateway 300 and a web server, a DNS server, and a mail server 310 at an Internet Service Provider (ISP) to provided connection to the Internet.

In one embodiment discussed herein, the database architecture of the document management system of the present invention utilizes or is built upon Lotus Domino® server, Lotus Notes® Application Development Tools and Lotus® Script language. Other architectures are possible, however. Information regarding the use of these Lotus tools is provided, for example, in *Lotus Notes Application Development I and II*, Release 5, Lotus Development Corporation (1999); *Lotus Notes Programmer's Guide*, Release 5, Lotus Development Corporation (1999); *Lotus Domino Administering the Domino System*, Release 5, Lotus Development Corporation, (1999); *Lotus Domino Managing Domino Databases*, Release 5, Lotus Development Corporation (1999); and *Lotus Domino Configuring the Domino Network*, Release 5, Lotus Development Corporation (1999), the disclosure of which are incorporated herein by reference.

The Lotus Domino server family provides an integrated searching, indexing, messaging, intranet, extranet, and Internet applications software platform. Lotus Domino supports many different services/protocols including, for example, SMTP, MIME, S/MIME, SSL, POP3, IMAP4, LDAP, HTTP, HTML and SNMP.

Lotus Domino also facilitates access to information through a browser, making the information available to a user from anywhere via, for example, the Internet. Web-based access through a browser is automatically enabled by Lotus Domino without additional hardware or software. A database created in a Domino environment is, therefore, a browsable database. To access documents through the Internet in an environment other than Lotus Domino typically requires running an additional server (for example, Microsoft IIS) and a knowledge of HTML or Java to design an interface for a user to search or view the existing document database.

The integrated services of a Lotus Domino enterprise environment also simplify hardware requirements as compared to other architectures. For example, the hardware for the document management system of the present invention may comprise a single server to perform intranet/extranet and Internet- or web-based database functions with the use of Lotus Domino. Moreover, disaster recovery may, for example, be achieved through two inherent redundancy features: (1) replication, which is a scheduled process and (2) clustering, which is a real-time process.

Figure 4A:
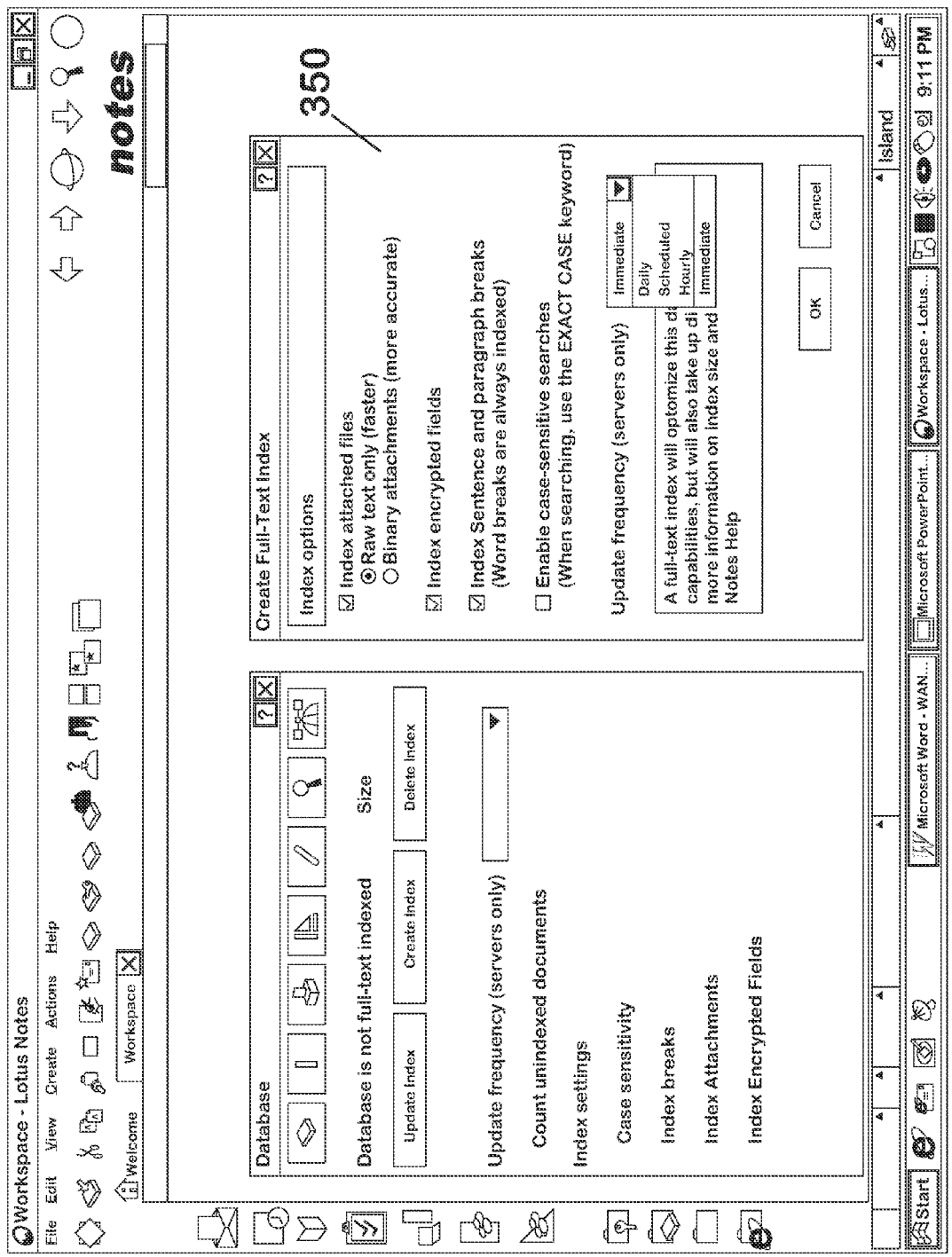
FIG. 4A illustrates a screen capture providing for full text indexing of documents.
Figure 4B:
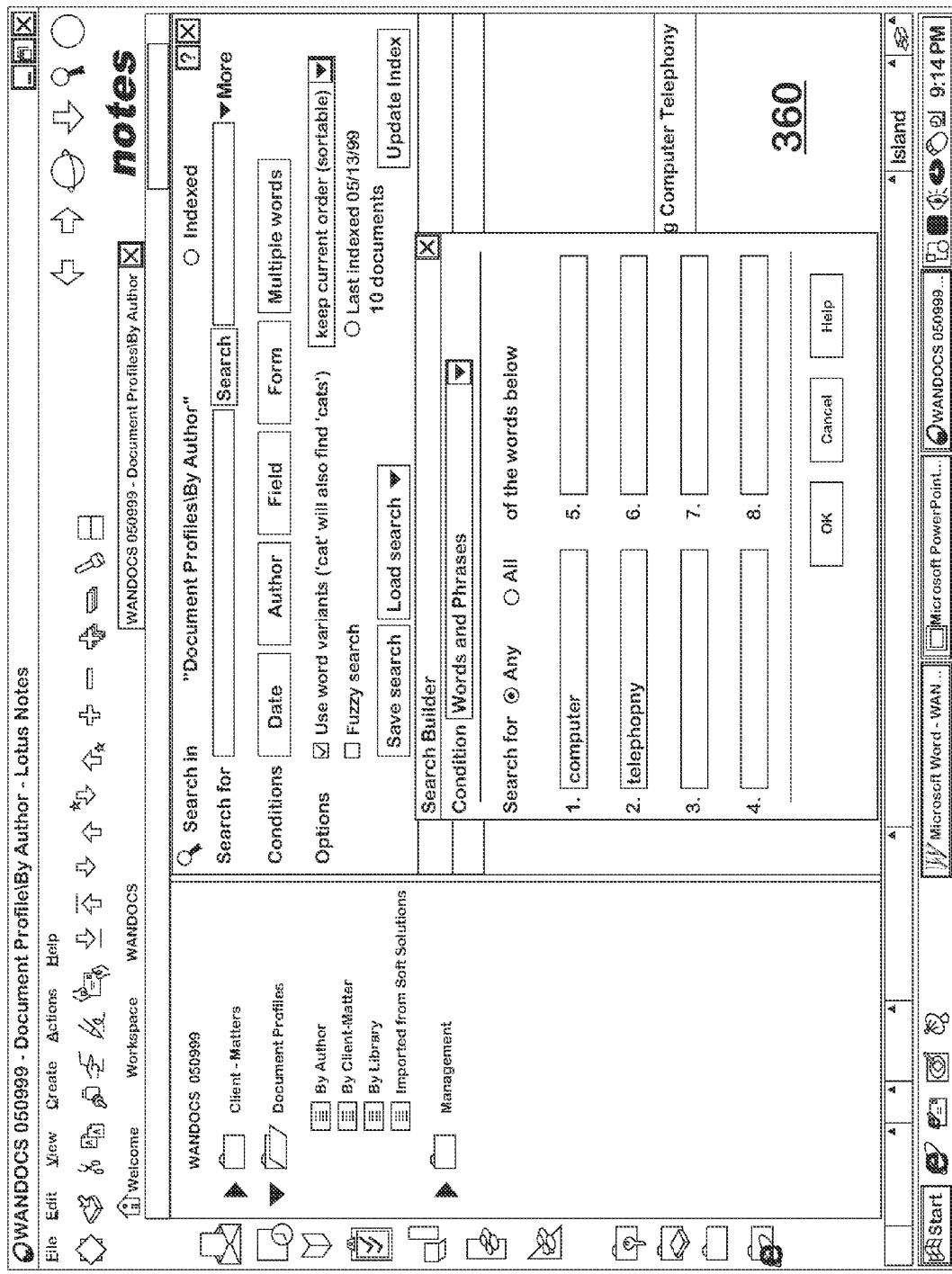
FIG. 4B illustrates a screen capture providing for searching capability.

Other server/client environments typically require separate software/hardware components to create full-text indexes and query capabilities. The Lotus Domino environment does not require these additional components. Full-text indexes are built by turning on the full-text index option inherent in Lotus Domino as illustrated in box 350 of FIG. 4A. Query capabilities are provided through a standard search bar or query by example form as illustrated screen 360 of FIG. 4B, which does not require the purchase of an SQL server.

As will be appreciated by one skilled in the art, however, all the functionality provided by Lotus Domino is available using other servers. For example, Microsoft NT Server can be used in conjunction with an indexing server such as Verity® and a searching server such as Microsoft SQL®. Internet applications can be provided by, for example, Microsoft IIS server, which enables/facilitates web access when used in connection with, for example, an HTML or JAVA front-end program to access the back-end database.

Figure 5A:
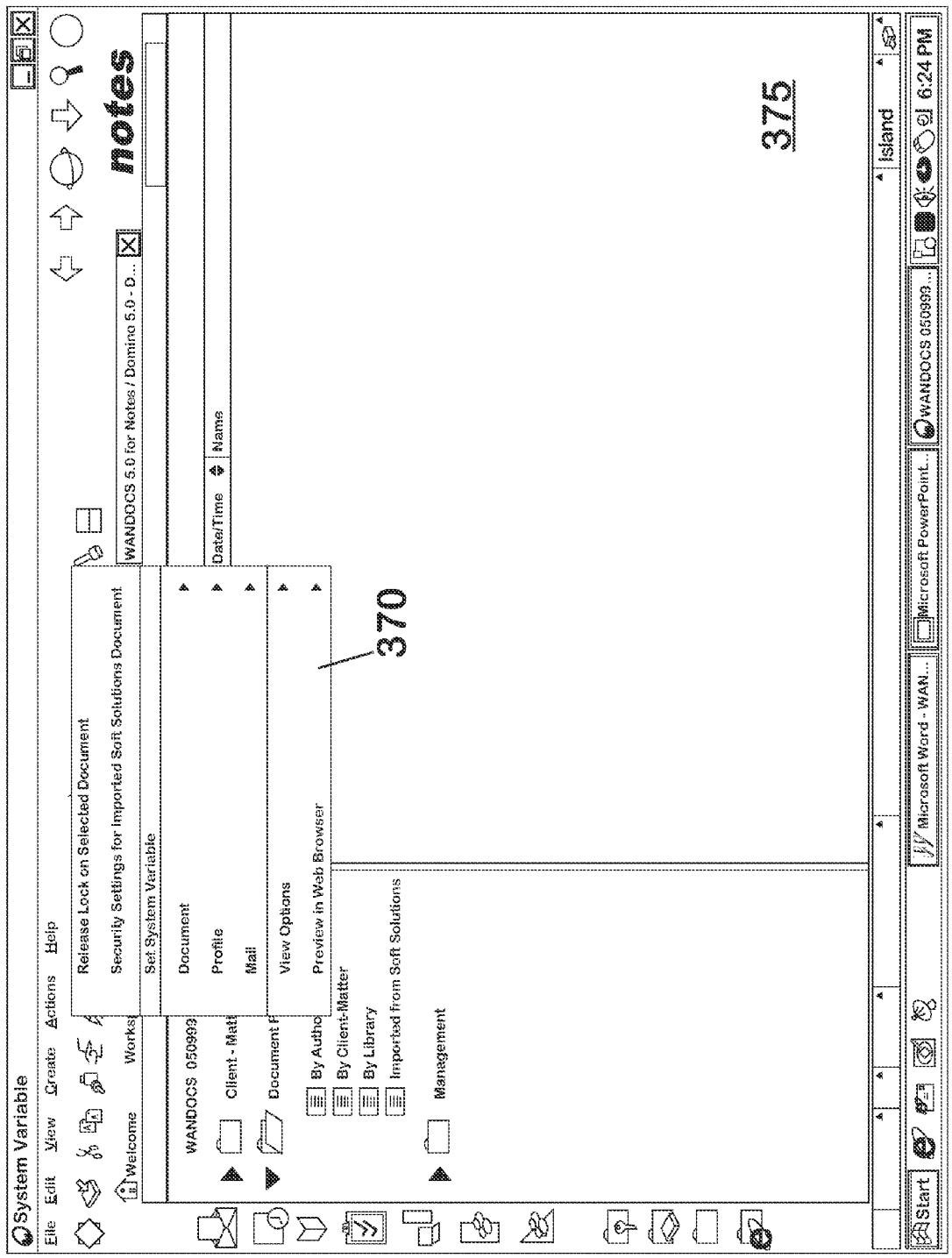
FIG. 5A illustrates a screen capture of initiation of a process for setting system variables.
Figure 5B:
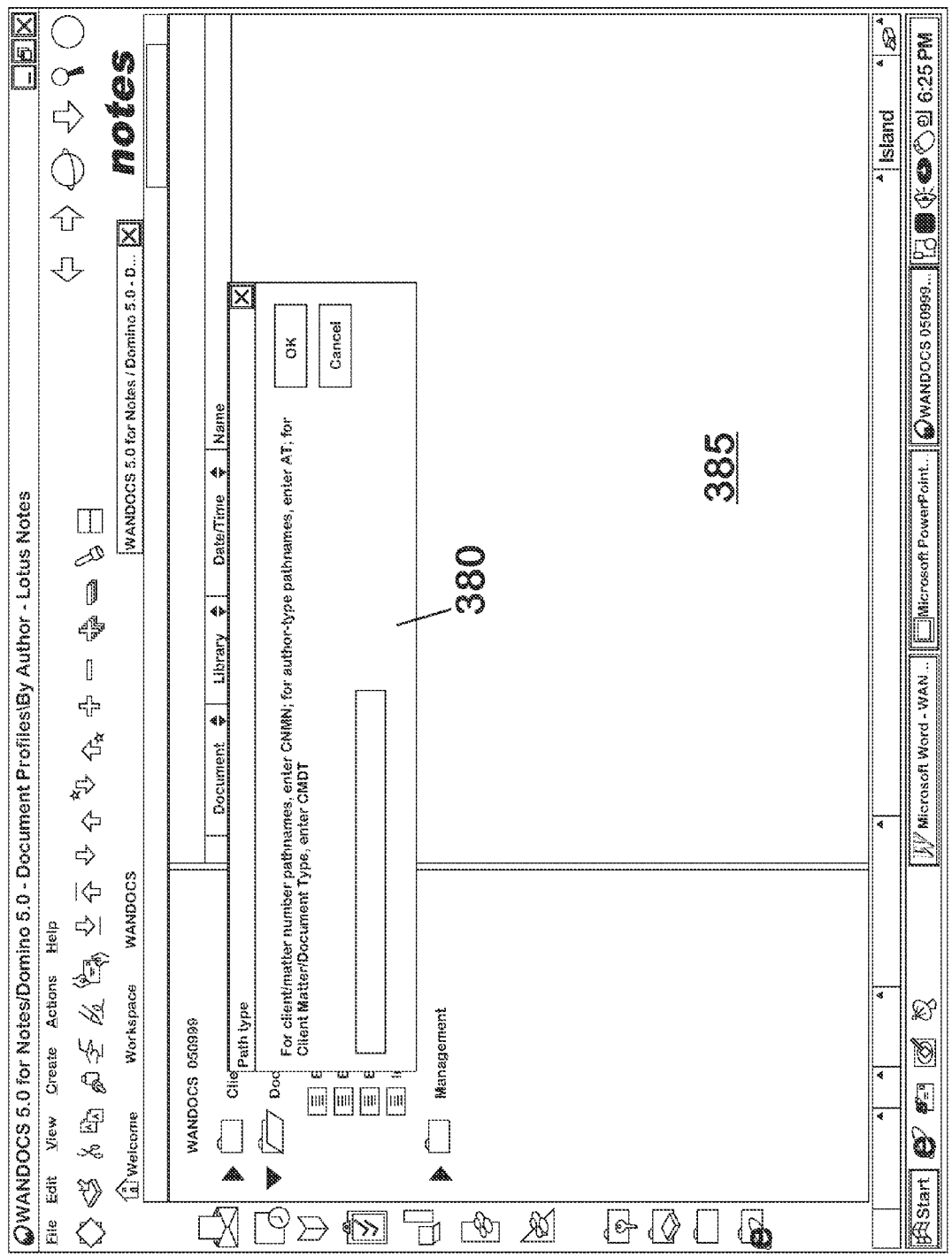
FIG. 5B illustrates a screen capture of an information/variable query during setting of system variables.

Several system variables of the document management system of the present invention are preferably set by, for example, a network administrator during installation of the system. Preferably, the installation process includes answering a few queries or requests for information to set up system parameters through variables that define, for example, the location of document files and templates. The system variables setup process may be initiated by selecting Set System Variable from Actions menu 370 of screen 375 as illustrated in FIG. 5A. The answer to a first query preferably defines how an organization desires to store its documents as illustrated by query box 380 of screen 385 in FIG. 5B. Several options are preferably provided. Documents may, for example, be stored by Author/Document Type, Client/Matter, or Client/Matter/Document Type. The answer to a second query preferably defines the path where "public" document contents 20 are to be stored in file system 120. The answer to a third query preferably defines a mapped drive to identify the path of the document storage. A template directory and a mapped drive for the template directory are also preferably defined by the network administrator in response to other queries.

Setting these variables enables an administrator and/or a user to select any operating system/file system to store documents and templates. Documents and templates stored in file system 120 are preferably linked to database 40 in a manner so that any operating system and/or mapped drive can be used to store the documents and templates.

Unlike prior document management systems, the document management system of the present invention preferably provides for replication of all data in database 40 as well as all document contents 20 or other document management system date stored externally from database 40 to a secondary server to provide for redundancy. Although some current document management systems allow storage of documents external to the database thereof, these document management systems enable replication/redundancy of only documents and other data stored within the database. Preferably, the user/administrator of the document management system of the present invention is queried as to whether replication/redundancy is desired during the process of setting the system variables. If replication/redundancy is desired, another query is preferably made to set the drive mapping and path of the secondary server on which replicated documents are to be stored.

Preferably, the replication process takes place during Profile-New, -Edit, -Copy and -Save functions. During any of these functions, the document management system of the present invention preferably checks for the newest or most current version based on date and copies the most newest version to the replicated server. If for some reason the replicated server is not available, the document management system preferably marks the profile for replication to occur after the replicated server is once again available.

Figure 6A:
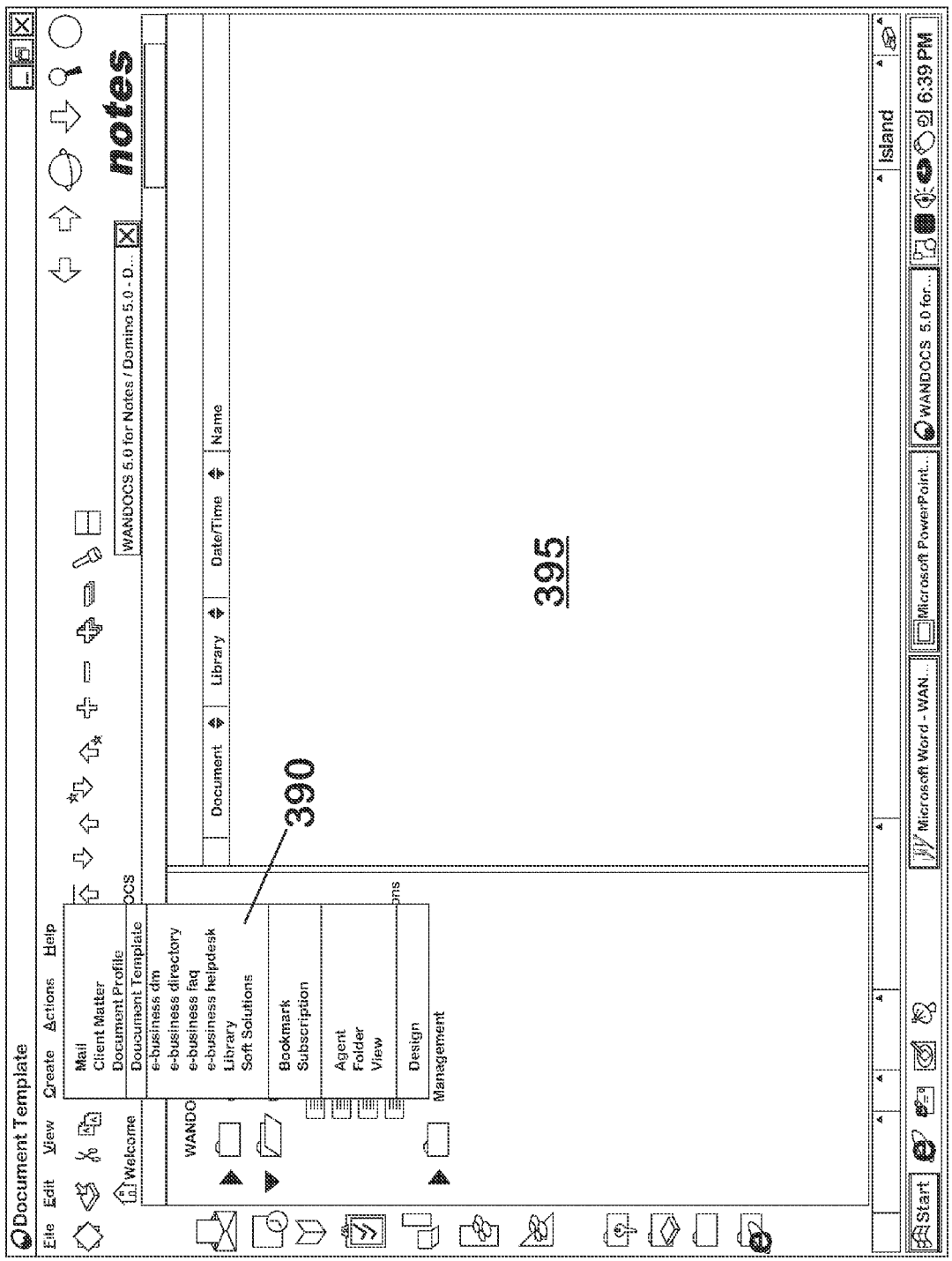
FIG. 6A illustrates a screen capture of initiation of a process for defining document templates.
Figure 6B:
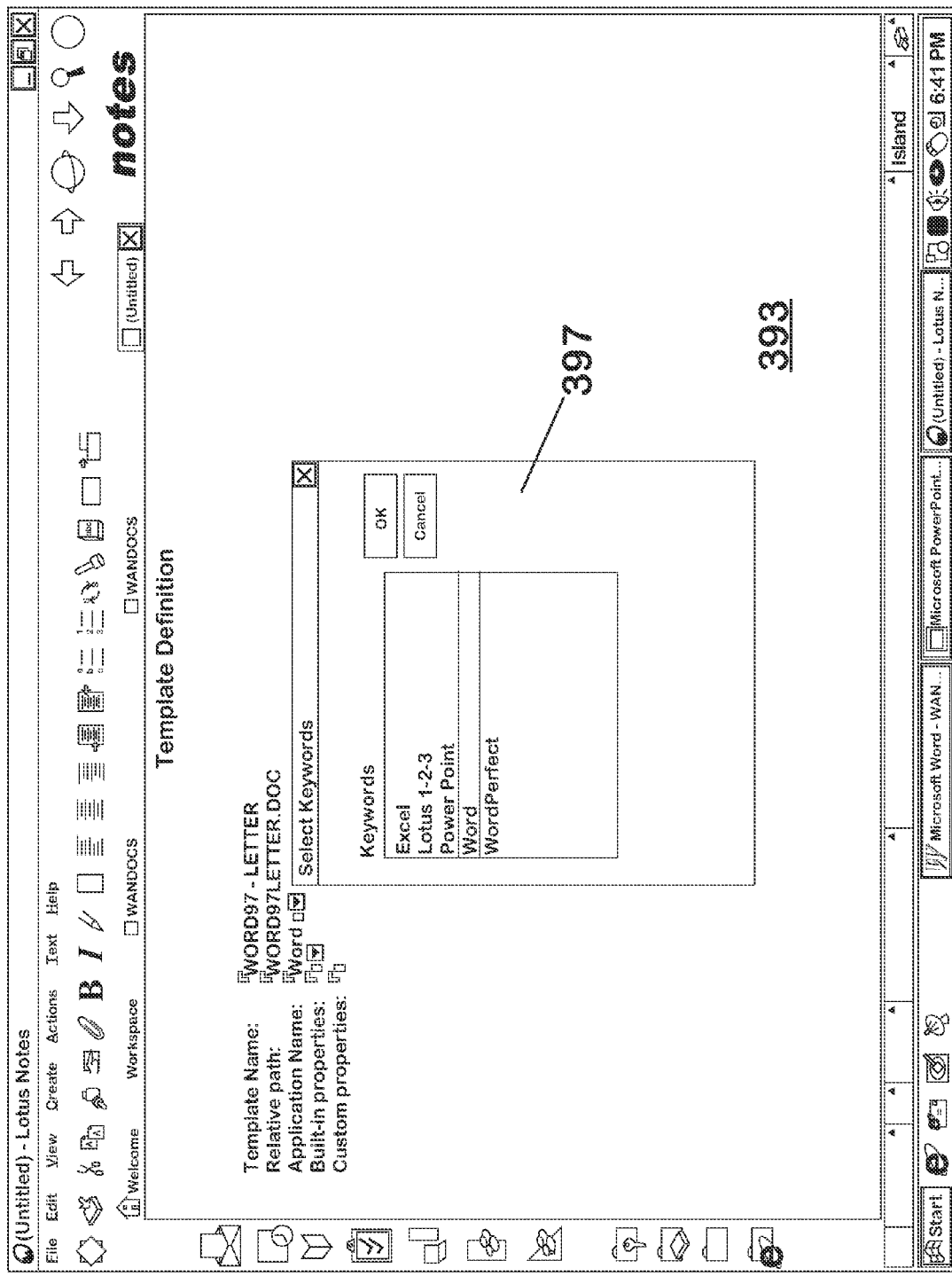
FIG. 6B illustrates a screen capture of definition of a document template.

Defining templates within a document management system is a another unique function of the document management system of the present invention. The system administrator or other person of the document management system of the present invention can set up templates based on software application and a document type (for example, letter, memorandum, budget, etc.) under the create menu 90 as illustrated in screen 392 of FIG. 6A. As illustrated in screen 393 of FIG. 6B, the administrator can define, among other things, a template name in field 394, a relative path for the template in field 395 and an application associated with the template in field 396. Preferably, the administrator is provided with a menu for each choice as illustrated by application menu 397 in FIG. 6B.

The user is thereby preferably presented with a predefined formatted document template that ensures compliance with company policy and consistent formatting in generating documents. All templates may, include, for example, the company name/logo and a footer including a unique document identifier. The document template is preferably chosen by the user when completing document profile 30 and does not require the user to first launch the associated application. Such templates are discussed in further detail below.

Any number of parameters for organizing documents or identifying documents can be included in the document management system. For example, lawyers typically identify particular tasks with a particular client and a particular matter for that client. For example, the client may be NewCo, Inc. and the matter may the NewCo, Inc. vs. OldCo, Inc. litigation. Client/Matter definitions preferably comprise unique alpha/numeric code and/or names. For example, the above client can be represented by a unique client name (for example, "NewCo, Inc." as well as a unique client number (for example, 20001). Likewise, the matter can be represented by a unique name (for example, "NewCo, Inc. vs. OldCo, Inc.") as well as a unique number (for example, 00001). This information can be typed into the document management system manually (by selecting Client-Matter in Create menu 390) or be imported electronically (from, for example, an existing database such as a billing system or other document management system) through, for example, an ASCII import/export.

A user or system administrator preferably also defines particular library that, for example, includes an office location and a Universal Resource Locator (URL) associated to each office specifying the name of the server and the path of the document storage as defined above to facilitate access to the database via the Internet.

Figure 7:
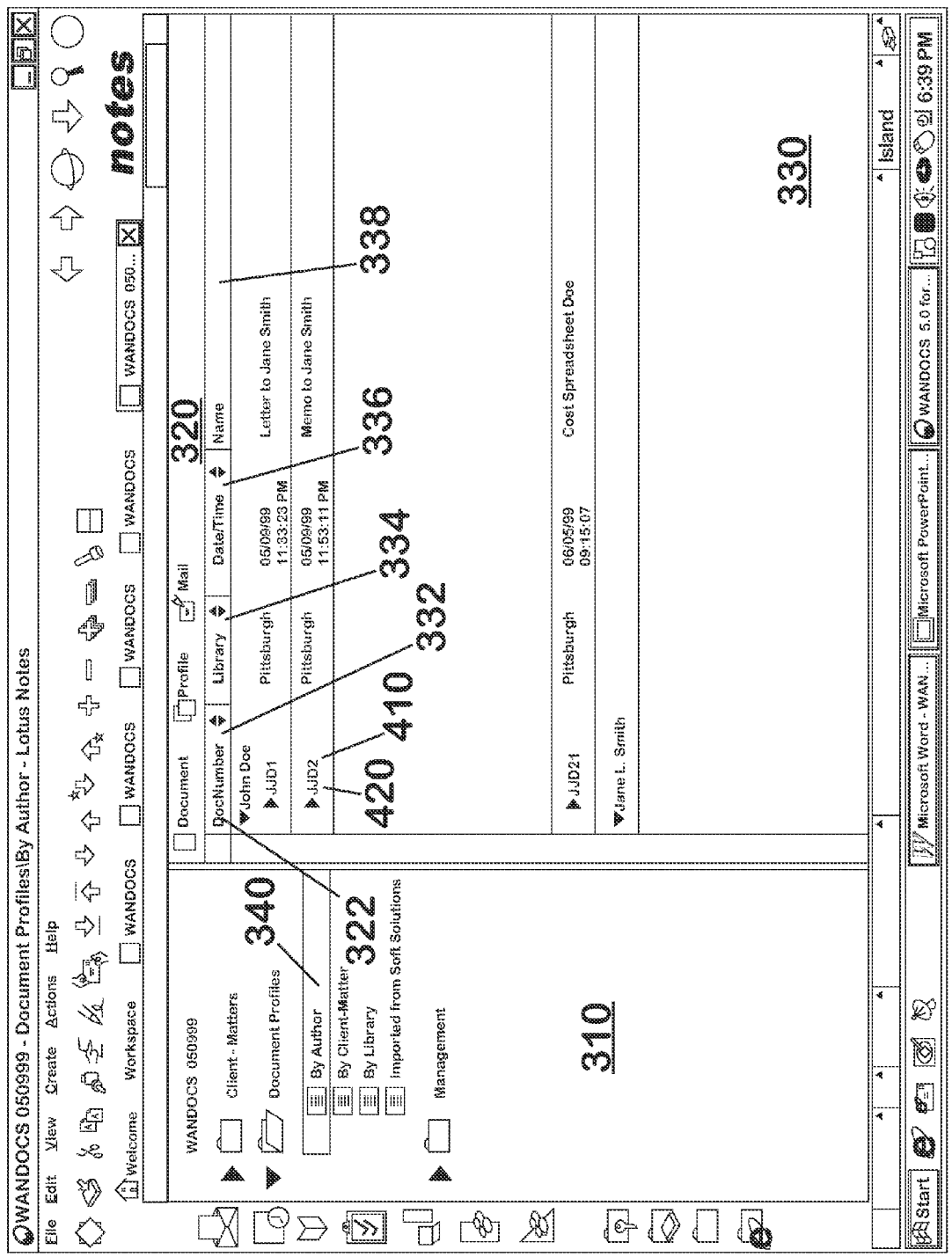
FIG. 7 illustrates a screen capture of an embodiment of a navigator of the document management system of the present invention.

FIG. 7 illustrates a screen capture showing a preferred embodiment of a navigator 300 of the document management system of the present invention or panes. Navigator 300 is preferably divided into three sections. A folder/view identifying pane 310 on the left side of navigator 300 preferably includes graphical representations of folders for organization of information and graphical representations for exhibiting predefined views for illustrating information (for example, a list of document profiles). In the embodiment of FIG. 7, for example, document profiles can be organized and viewed by author, by client-matter or by library. Other views can be defined by the user or an administrator. Such views are preferably continually updated and an index built with every newly created document. A second section of navigator 300 comprises an action bar 320 with dynamic buttons as known in the art to enable the user to perform a task or function. A third section of navigator 300 is a view pane 330 in which a view chosen in folder/view identifying pane 310 is presented. In FIG. 7, the By Author view 340 has been selected in folder/view identifying pane 310, and the document profiles are arranged by author in view pane 330. View pane 330 preferably includes pre-defined field sort buttons 332, 334, 336 and 338 which enable ascending or descending sort functions base on the fields or attributes below the view pane buttons. For example, the document profiles listed in FIG. 7 can be sorted by document number, library, date/time and document title or name using field sort buttons 332, 334, 336 and 338, respectively. Below field sort buttons 332, 334, 336 and 338 is a list of documents profiles that pertain to the selected view.

Action bar 320 may, for example, include a Document button 322 that when pressed exhibits a drop down menu allowing a user to Edit, View, or Print a document or documents corresponding to a selected (highlighted) document profile or profiles. A Profile button 324 is preferably provided to allow a user to Create, Copy, Edit, Print, or View a selected document profile via, for example, a drop down menu. A Mail button 326 is preferably provided to allow a user to mail a Link to Document, to mail a Copy of Document, or to Switch to a mail program in Notes (or another application) via a pull down menu.

Choosing to mail a Link to Document enables the user to automatically, from within the document management system, create an email message including a link to the profile record. The user is preferably switched to an email program to mail the link. The recipient of the email message can work on/edit the database record from their mail system. Choosing to mail a Copy of Document copies the external file corresponding to document content 20 from file system 120 to an email message. Preferably, the user is switched to the email program/system and to the email with the selected document selected. The recipient of the email message can edit the copy of the document. However, the document in the database record will remain unchanged.

Choosing to Switch to Notes (or another application or functionality—for example, Switch to Microsoft Outlook) serves a number of purposes. For example, it conveniently enables a user to switch to their mail, calendar or other features at any time while working in the document management system. It also operates with the Notes link field on the document profile screen which is described in connection with document profiles below.

Figure 8:
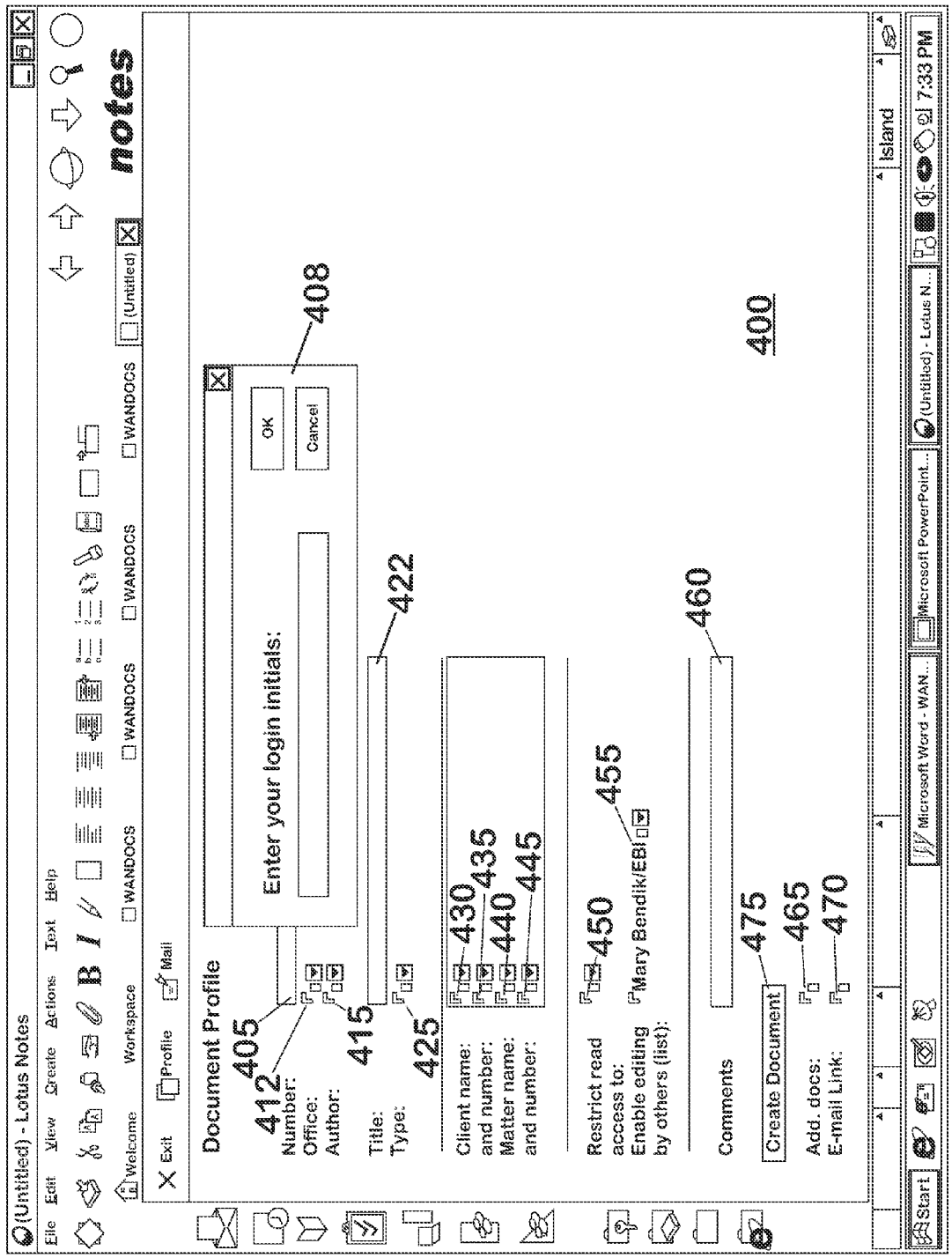
FIGS. 8 and 9 illustrate an embodiment of a document profile screen for use in the document management system of the present invention.
Figure 9:
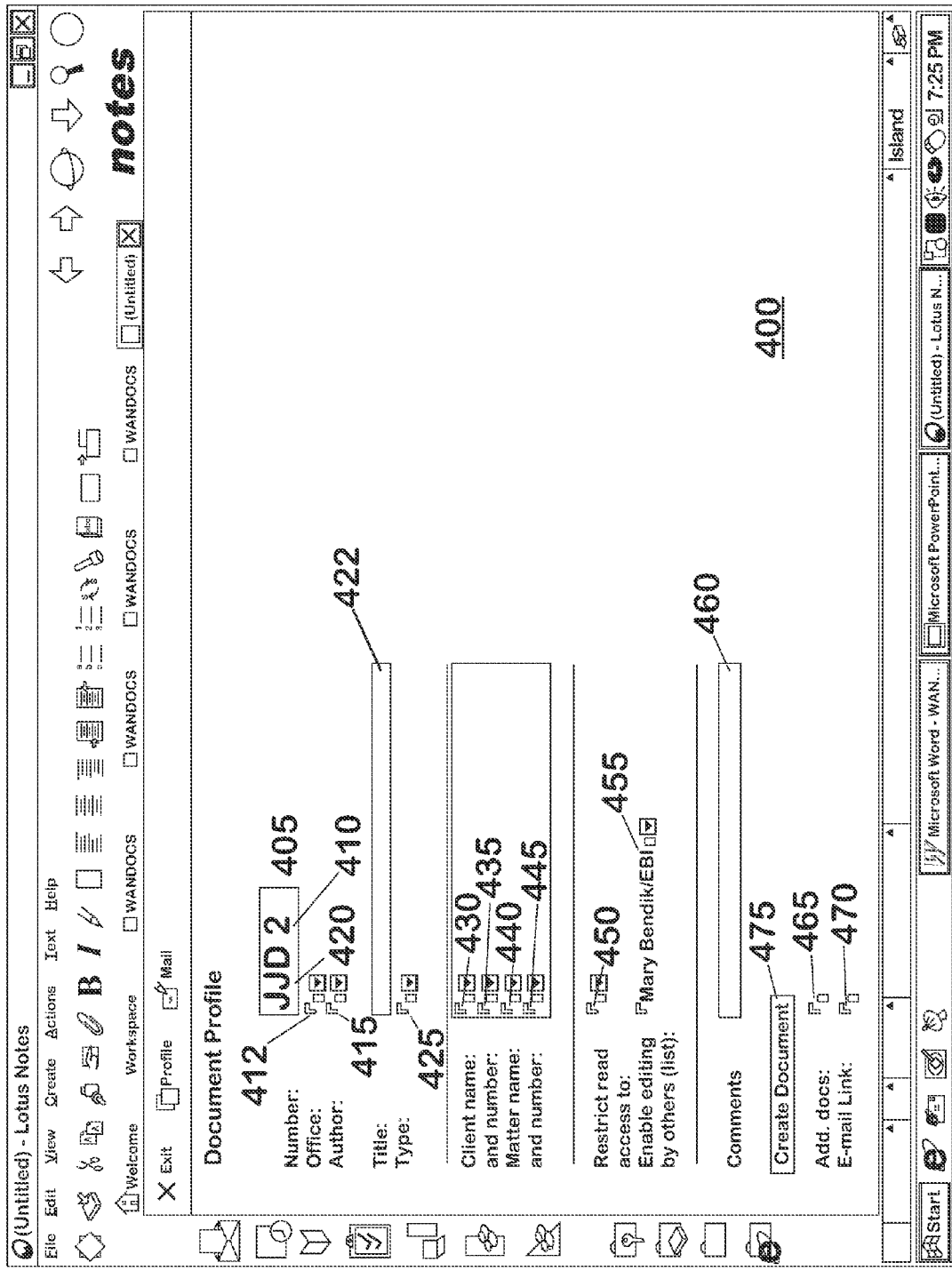

Document profile 30 is a very important function of the document management system of the present invention. As described above, document profile 30 includes the key fields of information or attributes that a user utilizes to define an associated document content 20. A document 10 can be located via text searching capabilities using the fields defined in associated document profile 30. An embodiment of a document profile screen 400 is illustrated in FIGS. 8 and 9.

Document profile screen 400 preferably appears as soon as a document is created so that document attribute fields (including a unique document identifier generated by the document management system) are established before the user enters data into document content 20.

Document profile 30 preferably includes any number of attribute fields to suitably identify/define associated document content 20. Like other document management systems, a unique document identifier/number is preferably generated by the document management system of the present invention. Unlike other document management systems, however, the unique document identifier comprises a numeric portion 410 (see FIG. 5) generated by the document management system of the present invention and one or more information portions 420 (for example, prefix(es) and/or suffix(es)) that assist in identifying documents by providing information about the document. For example, a preferably unique document identifier prefix may comprise a user's initials (typically entered at log on—for example, John J. Doe would enter "JJD"). The document identifier will thus comprise the user's initials followed by, for example, a number unique for that individual (preferably, a sequential number generated by the document management system starting, for example, with the number one). For example, the first document as created by John J. Doe would have the document identifier jjd1. The document identifier preferably appears in a document identifier/number field 405 on document profile screen 400. A user may, for example, be required to enter the user's login initials when a document profile is created as illustrated by query box 408 of FIG. 8.

In this embodiment, a second user will have a document identifier prefix that comprises the user's initials (typically entered at log on—for example, Jane L. Smith would enter "JLS"). The document identifier for the second user will thus comprise the second user's initials followed by a sequential number generated by the document management system starting with the number one. The first document created by Jane L. Smith would have the document identifier jls1, while the twenty-first such document would have the document identifier jls21.

The unique document identifier of the present invention easily identifies how to locate a document without having to perform a search. A user can simply, for example, go directly to the By Author view discussed above in connection with FIG. 7 and locate the document corresponding to the identifier jjd1 without a query-by-example search that is necessary with other document management systems. The sequential number portion of the document identifier also serves as a productivity measure based on the number of documents a user generates. All other document management systems require a report writer function to produce these types of statistics.

An office field 412 preferably identifies the location/library in which a document is stored. Choices for office field 412 and several other fields described below are preferably provided through a pull down menu. An author field 415 identifies the author of the document. As with office field 412, a pull down menu is preferably provided to allow selection of an author. The menu is, for example, preferably generated using the Central Administration Address Book that is utilized for other Lotus applications. As discussed above, there is only one place to maintain a user list and the security associated with authentication in this manner. Many other systems require the user to have separate address books (i.e. one for e-mail, one for the operating system, one for document management, etc.).

A title field 422 is provided to enable the user to define a preferably descriptive title for the document. A document type field 425 is preferably provided and serves two purposes. First, document type field 425 identifies the application software that is being requested. Second, the type/template of document generated is also identified. For example, the application may be indicated as Microsoft Word 97® and the document type may be indicated a "Letter," which indicates that the user is selecting to create a letter using Microsoft Word 97. Moreover, as discussed above, a template is preferably associated with the type of document (LETTER in this example) that has a unique set of formatting instructions already in place for the creation of a document, providing improved productivity and consistency. A pull down menu is preferably provided for selection of a document type.

A client name field 430 and a corresponding client number field 435 may be provided with associated pull down menus. Likewise a matter name field 440 and a corresponding matter number field 445 are preferably provided with associated pull down menus. The client identifier fields 430 and 435 and the matter identifier fields 440 and 445 are preferably related to each other in a parent/child relationship. Preferably, the client identifier is the parent and the matter identifier is the child. Therefore, specific matter identifiers only appear based on the specific client selected. As discussed above, these fields may be populated by an ASCII imported file that is preferably updated periodically (for example, daily), from, for example, a billing system or program using an agent program provided in the document management system of the present invention. The agent program preferably specifies the import schedule and the action to be taken.

A security or restrict read access field 450 is preferably provided to define document security. Preferably, only individual(s) and/or group(s) selected/displayed in security field 450 can see that the document profile exists. In general, other document management systems are limited to defining groups or types of security. Likewise, a second security field 455 enables restriction access/editing privileges to document content 20. If nothing is entered in security field 450 or security field 455, document profile 30 and document content 20 will be public. As discussed above, the document management system of the present invention enables integration with the security system of, for example, the Central Administration Address Book of Lotus Domino to identify potential users and groups of users.

A comments field 460 is preferably provided to enable entrance of unlimited comments to enhance full-text search capabilities.

An add. docs (additional documents) field 465 (for example, a rich text filed) is preferably provided to enable any number of multiple documents or any other file type (for example, document files, database records, or URL links) to be included on a single document profile. Other document management system do not enable multiple documents to be contained on a single document profile. Additional document field 465 enables a user to attach file types and links that are external to the document management system (that is, file types that were not created within the document management system and that do not have an associated profile). Such documents may, for example, be related to the main document (that is, the document for which the document profile has been created). Other document management systems require the user to link only document profiles through a related document feature.

An email/other field 470 (preferably, a rich text field) enables the user to link email messages (typically, a database record) and/or any other type of database file, view, folder, calendar entry, to-do item, etc. to the document profile. No other document management system allows for this type of relationship/linking between the document profile of the document being created and other types of documents or files that are associated with, for example, a matter and/or project. Other document management systems require the user to organize separate document profiles into folders and do not allow for other, external file types to be linked to the document profile.

A create document button 475 is preferably provided on document profile screen 400 to launch or invoke the application specified in type field 425 and creates a file in the operating system based on the predefined system variables that were selected by the administrator upon setup of the database. The document management system of the present invention is the only document management system that automatically passes the unique document identifier, the title and the author to the external application upon document creation. Other document management systems assign a temp file number and require the user to save the file and then return to the document management system to obtain the unique document identifier.

Although optimized for 32-bit applications, the document management system of the present invention is preferably not limited to 32-bit applications. The document management system can preferably launch any type of file format. A number of other document management systems do not allow 16-bit applications to be integrated into the system.

The details of four forms (Client/Matter, Document Profile, Document Template and Library) and script associated therewith of one embodiment of the present invention are set forth in the Appendix hereto.

Although the present invention has been described in detail in connection with the above examples, it is to be understood that such detail is solely for that purpose and that variations can be made by those skilled in the art without departing from the spirit of the invention except as it may be limited by the following claims.

What is claimed is:

1. A method for managing documents in a computer implemented document management system, comprising:
creating a document profile that is associated with a document within the document management system and includes fields of attributes of the document; and
associating one or more documents external to the document management system with the document profile by creating a URL in the document profile containing an address to a file that does not have an associated profile in the document management system and is of a file type that is not created within the document management system.

2. The method of claim 1 wherein the file type is a word processing document, a spreadsheet document, a database record or a URL link.

3. The method of claim 1 wherein the file type is an email record.

4. The method of claim 1 further comprising:
creating a document profile that includes fields of attributes of a document for each of the documents;
generating a unique identifier for each of the documents, the unique identifier including at least a first portion including information descriptive of an attribute of the document and at least a second portion including an automatically generated number, the unique identifier being visible to users of the document management system and providing information about the corresponding document to the users so that each of the documents can be identified from the corresponding unique identifier among a group including unique identifiers corresponding to other documents; and
storing the document profile for each of the documents.

5. The method of claim 4, wherein the first portion includes information descriptive of the author of the document.

6. The method of claim 5 wherein the second portion is a sequentially generated number unique for the first portion.

7. The method of claim 4 wherein the second portion is a sequentially generated number unique for the first portion.

8. The method of claim 4, wherein the unique identifier is generated before the document content is entered.

9. The method of claim 1 further comprising requiring selection of a predefined document template from a set of predefined document templates for the document during creation of the document profile, the document template defining the format of the document and a software application to use for generation of the document.

10. The method of claim 1 further comprising creating an email message via a messaging system external to the document management system including a link to the document profile using a selector within the document management system so that a recipient of the message can access the document associated with the document profile if the recipient has appropriate authorization to access the document associated with the document profile.

11. The method of claim 1 further comprising creating an email message via a messaging system external to the document management system including a copy of the document using a selector within the document management system so that a recipient of the message can access the copy of the document.

12. The method of claim 1 further comprising defining user access permission in the document profile, wherein the step of defining user access permission includes the step acquiring the identity of the user from a source external to the document management system.

13. The method of claim 12 wherein the source of the identity of the user is an operating system security system or a database security system.

14. A computer implemented document management system, the computer comprising a processing unit and a storage device, the document management system comprising:

a module to create a document profile that is associated with a document within the document management system and includes fields of attributes of the document; and a module to associate one or more documents external to the document management system with the document profile by creating a URL in the document profile containing an address to file that does not have an associated profile in the document management system and is of a file type that is not created within the document management system.

15. A method for managing documents in a computer implemented document management system, comprising:

creating a document profile that is associated with a document within the document management system and includes fields of attributes of the document; and associating a document that does not have an associated profile in the document management system with the document profile by creating a URL in the document profile containing an address to a file external to the document management system and of a file type that is not created within the document management system.

16. The method of claim 15 further comprising displaying the document profile and at least one URL to a file external to the document management system.

* * * * *